United States Patent [19]

Hair et al.

[11] Patent Number: 5,326,582
[45] Date of Patent: Jul. 5, 1994

[54] NONAQUEOUS SHORTENING COMPOSITIONS WITH REDUCING SUGAR PARTICLES SUSPENDED THEREIN

[75] Inventors: Eddy R. Hair, Cincinnati, Ohio; Nancy A. Kinach, Thornhill, Canada

[73] Assignee: The Procter & Gamble Company, Cincinnati, Ohio

[21] Appl. No.: 974,032

[22] Filed: Nov. 10, 1992

[51] Int. Cl.$^5$ .............................................. A23D 9/00
[52] U.S. Cl. .................................. 426/613; 426/442; 426/658
[58] Field of Search ...................... 426/613, 658, 442

[56] References Cited

U.S. PATENT DOCUMENTS 3,514,298  5/1970  Noznick et al. ...................... 426/613
4,375,483  3/1983  Shuford et al. ................... 426/330.6
4,384,008  5/1983  Millisor ................................ 426/613
4,385,076  5/1983  Crosby ................................. 426/613
4,698,230 10/1987  Willard ................................ 426/650
5,045,337  9/1991  El-Nokaly et al. ................. 426/602

Primary Examiner—Helen Pratt
Attorney, Agent, or Firm—William J. Winter

[57] ABSTRACT

Disclosed are nonaqueous shortening compositions containing reducing sugars. The reducing sugars are substantially uniformly suspended throughout the nonaqueous shortening composition. The composition can be used as butter or margarine substitutes in baking or cooking where the cooking progress is monitored by surface browning of food. The composition contains from about 90 to 99.5% by weight of an edible lipid and from about 0.25 to 5% by weight of a reducing sugar.

16 Claims, No Drawings

NONAQUEOUS SHORTENING COMPOSITIONS WITH REDUCING SUGAR PARTICLES SUSPENDED THEREIN

FIELD OF THE INVENTION

This invention relates to nonaqueous shortening compositions containing suspended reducing sugar particles.

BACKGROUND OF THE INVENTION

Baked foods commonly contain edible lipids which provide a taste benefit. These lipids are typically added to the foods in the form of butter or margarine. They can also be added as a solid or liquid shortening. Butter or margarine provides a butter flavor benefit not provided by most shortenings.

However, butter flavorants can be added to shortenings. Butter flavored shortening have been used as butter or margarine substitutes in cooking or baking. However, there are problems associated with the use of shortenings, butter flavored or otherwise. Shortening-containing baked goods are sometimes dry and overcooked. This happens because consumers tend to use surface browning of foods as the primary indicator of cooking progress rather than receipe times. Shortening-containing foods bake to lighter colors than margarine or butter-containing foods. Consumers tend to bake all foods, shortening-containing or otherwise, to the same brown color. This frequently results in overcooking and dryness of the shortening-containing foods. Even when consumers cook to recipe times rather than surface brownness, the shortening-containing foods often have an undesirably light, uncooked appearance.

Browning agents which are typically lipid insoluble have been added to lipid compositions by including them in the lipid insoluble phase of microemulsions. One product of this type is disclosed in El-Nokaly, Hiler and McGrady U.S. Pat. No. 5,045,337, Issued Sep. 3, 1991 (El-Nokaly et al.). In El-Nokaly et al., water-in-oil microemulsions are made from a polar solvent (i.e., water), polyglycerol mono/diester emulsifiers and lipid. The microemulsions can be used to encapsulate water-soluble materials including browning agents (i.e., proteins and reducing sugars) into lipid-based products such as cooking or salad oils.

Using microemulsion technology (e.g., per El-Nokaly et al.) as a means of adding reducing agents to lipid compositions provides an excellent way of preparing stable clear oil food products. However, use of such microemulsions can also present some difficulties. For example, preparation of water-in-oil microemulsions involves the use of a polar solvent such as water. Water added to shortening can cause spattering during cooking. Water can also promote lipid rancidity.

It is therefore an object of this invention to provide nonaqueous shortening compositions that contain reducing sugars as a means for monitoring cooking progress. It is a further object of this invention to provide such compositions without relying upon microemulsion technology.

SUMMARY OF THE INVENTION

The invention provides nonaqueous solid or liquid shortening compositions containing reducing sugar particles. Such compositions contain from about 90 to 99.5% by weight of an edible lipid, and from about 0.5 to 5% by weight of the reducing sugar particles. The reducing sugar particles are preferably nonencapsulated and are also generally substantially uniformly suspended throughout the nonaqueous shortening compositions. Cooking or baking of food materials containing or contacting the shortening compositions can be monitored by surface browning of the food material or by recipe times.

DETAILED DESCRIPTION OF THE INVENTION

The terms used herein have the following meanings:
1. "Solid", "liquid" or "fluid" refer to the physical state of a material at room temperature (about 21° C.) unless otherwise specified. The terms "fluid" and "liquid" are used interchangeably.
2. "Lipids" are edible hydrophobic organic materials containing long chain hydrocarbyl groups derived from fatty acids, e.g., fatty acid esters, fatty alcohols, waxes, etc. Lipids then include fats, oils or mixtures thereof, natural (derived from plants or animals) or synthetic. They are liquefiable at temperatures above 93° C. (typical cooking temperatures are from about 93° to 260° C.
3. "Fats" are solid lipids.
4. "Oils" are lipids that are in a fluid state.
5. "Solid shortenings" are fats, or solid mixtures of fats and oils, which are useful in baking.
6. "Liquid shortenings" are lipids in a fluid state which contain solid lipid particles substantially uniformly dispersed therethrough. Lipid shortenings are also useful in baking.
7. "Nonaqueous" means a polar solvent, e.g., water, content of less than about 0.1% by weight. Accordingly, the term "nonaqueous shortening" does not encompass cooking oils comprising water-containing microemulsions.
8. "Substantially uniform suspension or dispersion" refers to distribution of solid particles in a liquid in a manner which avoids excessively higher or lower relative localized concentrations of the particles in the liquid.
9. "Encapsulated" refers to lipid insoluble particles entrapped or encased within a nonaqueous lipid-insoluble matrix.

All ratios and percentages are based on weight unless otherwise specified.

A. Lipid Component

The lipid component of the nonaqueous shortening compositions of the invention comprises those materials utilized in conventional shortening compositions. The nonaqueous shortening compositions can be solid or liquid and comprise from about 90 to 99.5% by weight of edible lipids.

The edible lipid component of the nonaqueous shortening composition can be a fat or preferably a mixture of fat and oil. In the mixture of fat and oil, the types of fats and oils selected (i.e., amount, iodine values, etc.) are such that the desired solid or liquid shortening results. Solid and liquid shortenings and their oil/fat compositions are well known in the art. The crystalline structure of the solid shortenings provide support for the reducing sugar particles described hereinafter and for other lipid insoluble additives also described hereinafter. Such support provides a means for maintaining a substantially uniform suspension of the reducing sugar or other particulates for extended periods of time.

Likewise, the dispersed solid fat particles in nonaqueous liquid shortening compositions provide a degree of support for the reducing sugar particles and other lipid insoluble additives. However, as described hereinafter, particle size is also important in maintaining a substantially uniform suspension of the particles in liquid shortenings.

Fats which can be used in the nonaqueous shortening composition include solid triglycerides having from about $C_{12}$ to $C_{22}$ fatty acid moieties. The fats can be synthetic or derived from animals or plants. Animal fats include lard tallow, oleo stock, oleo oil, oleo stearin and the like which are solid at room temperature. Suitable fats include highly saturated lipids derived from plant or vegetable oils. Suitable fats also include oils, typically unsaturated vegetable oils, that are converted into solid fats by partial hydrogenation of the unsaturated double bonds of the fatty acid constituents of the oil followed by conventional chilling/crystallization techniques or by proper mixture with sufficient solid triglycerides to form a rigid interlocking crystalline structure which interferes with the free-flowing properties of the liquid oil. See U.S. Pat. No. 3,355,302 to Purves et al., issued Nov. 28, 1967, and U.S. Pat. No. 3,867,556 to Darragh et al., issued Feb. 18, 1975, for further examples.

Oils which can be used in the nonaqueous shortening compositions include triglycerides having from about $C_{16}$ to $C_{22}$ fatty acid moieties. The fatty acid moieties can be saturated or unsaturated. They can be derived from any of the naturally occurring glyceride oils. Examples of such naturally occurring oils include soybean oil, cottonseed oil, peanut oil, rapeseed oil, safflower oil, sesame seed oil, sunflower seed oil, olive oil, soybean oil, hazelnut oil, canola oil, linseed oil and corn oil. Also suitable are liquid oil fractions obtained from palm oil, lard, and tallow, as, for example, by graining or directed interesterification followed by separation of the oil.

As used herein, edible lipids include the so-called low molecular weight synthetic fats which are certain tri- or diglycerides in which one or two of the hydroxyl groups of the glycerin have been esterified with acetic, propionic, butyric or caprionic acids and one or two of the remaining hydroxyl groups of the glycerin have been esterified with higher molecular weight fatty acids having from about 12 to 22 carbon atoms.

Other suitable types of edible lipids include: cocoa butter and cocoa butter substitutes, such as shea and illipe butter; milk fats, such as butter fat; and marine oils which can be converted into plastic or solids fats such as menhaden, pilchard, sardine, whale and herring oils.

Many classes of reduced calorie fat, fat-like substances, or mixtures thereof, are suitable for use in the nonaqueous shortening composition, to make up part or all of the lipid component. Medium chain triglycerides, highly esterified polyglycerol esters, polyoxyethylene esters and jojoba esters can be used.

Synthetic oils or fats which have been specifically tailored to provide calorie reduction benefits relative to conventional fats can be used. Of these, especially preferred are reduced calorie fats comprising at least about 15% by weight of triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

Other suitable fat-like lipids include sucrose polyesters. Solid sucrose polyesters and processes for making them are described in U.S. Pat. No. 4,005,195 to Jandacek, issued Jan. 25, 1977, U.S. Pat. No. 3,600,186 to Mattson et al., issued Aug. 17, 1971, U.S. Pat. No. 3,963,699 to Rizzi et al., issued Jun. 15, 1976, U.S. Pat. No. 4,518,772 to Volpenhein, issued May 21, 1985, and U.S. Pat. No. 4,517,360 to Volpenhein, issued May 14, 1985. Sucrose polyesters are fat-like polymers comprising sucrose fatty acid ester compounds that contain four or more fatty acid ester groups which are substantially non-digestible and consequently non-adsorbable by the human body. It is not necessary that all of the hydroxyl groups of the sucrose be esterified with fatty acid, but it is preferable that the sucrose contain no more than three unesterified hydroxyl groups, and more preferably that it contain no more that two unesterified hydroxyl groups. Most preferably, substantially all of the hydroxyl groups of the sucrose are esterified with fatty acid, i.e., the compound is substantially completely esterified. The fatty acids esterified to the sucrose molecule can be the same or mixed. The fatty acids groups esterified to the sucrose molecule must contain from about 8 to 22 carbon atoms, and preferably from about 14 to 18 carbon atoms.

B. Reducing Sugar Particles

The combination of reducing sugar particles with nonaqueous shortening compositions forms the basis for the present invention. The reducing sugar particles in the nonaqueous shortening compositions are generally substantially uniformly suspended throughout the shortening compositions.

The nonaqueous shortening compositions comprise from about 0.25 to 5% by weight of a reducing sugar, preferably from about 0.5 to 1.5% by weight of a reducing sugar. Reducing sugars are those carbohydrates that react with food proteins in Maillard reactions (browning reactions). Such reactions result in brown coloration on food surfaces. Reducing sugars can be identified as those carbohydrates that react with Benedict's solution. Suitable reducing sugars include monosaccharides, reducing polysaccharides, and nonreducing polysaccharides hydrolyzed into smaller reducing sugars. Preferably, the reducing sugar is fructose, glucose, levulose, dextrose, galactose, lactose, maltose or mixtures thereof. Most preferably, the reducing sugar is dextrose.

Thus, the nonaqueous shortening compositions provide reducing sugars which react with proteins in the food being cooked or baked. The reaction results in surface browning of food. The surface browning can be used by consumers to monitor cooking progress of foods being cooked or baked.

The reducing sugars can be incorporated into the nonaqueous shortenings in solid form by methods known in the art for incorporating lipid insoluble particulates into solid shortenings. They may be encapsulated but are preferably nonencapsulated. Particle size is not critical but will frequently be 20 microns or less.

The reducing sugars can also be incorporated into nonaqueous shortenings in liquid form by methods known in the art for incorporating lipid insoluble particulates into liquid shortenings. Such particles may be be encapsulated or nonencapsulated. For liquid shortenings, the reducing sugar particles are preferably nonencapsulated and should should be microfine particles wherein about 50% of the nonencapsulated reducing sugar particles have a particle diameter of less than about 20 microns, preferably about 90% of the nonencapsulated reducing sugar particles have a particle diameter of less than about 10 microns. Use of reducing sugar particles having these size characteristics helps ensure the stability of the substantially uniform suspension of such particles in the liquid shortening compositions.

C. Flavorants, Colorants

Flavor enhancing amounts of a flavorant can be added to the nonaqueous shortening composition. Butter flavorants are especially desirable. Examples of suitable butter flavorants include lower alkyl carboxylic acids, methyl ketones, lactones, diketones (diacetyl) and like compounds well known in the art. U.S. Pat. No. 4,384,008 to Millisor, issued May 17, 1983, discloses butter flavorants and is herein incorporated by reference.

Colorants can also be added to the nonaqueous shortening compositions. Yellow colors, for example, are especially useful when used with butter flavorants. Consumers have an expectation that butter flavored shortenings will also have a yellow butter-like color.

D. Lecithin

The nonaqueous shortening composition comprises from 0 to about 1.5% by weight of lecithin, preferably from about 0.2 to 1.0% by weight of lecithin. Lecithin minimizes sticking of cooked foods to cooking utensils. Lecithin can be derived from a variety of animal and vegetable sources. Suitable vegetable lecithins can be derived for example from soybean oil, ground nut oil, cottonseed oil and corn oil. From a commercial standpoint, soybean lecithin is preferred.

E. Flavor Enhancing Salt

The nonaqueous shortening composition can contain from 0 to about 4% by weight of flavor-enhancing salt particles, preferably from about 0.25 to about 2.5% by weight of flavor enhancing salt particles. The salt particles enhance the flavor, especially butter flavor, of added flavorants. Suitable flavor enhancing salts include sodium chloride, potassium chloride, potassium citrate, potassium bitartrate, monosodium glutamate, and mixtures thereof. Preferably the flavor enhancing salt is sodium chloride. The flavor enhancing salt particles can be encapsulated but are preferably nonencapsulated.

The size of the salt particles is not critical when such particles are used in nonaqueous solid shortening compositions but it is critical when such particles are added to nonaqueous liquid shortening compositions. In the latter, the salt particles must be microfine. A suitable method for incorporating microfine salt particles into the liquid shortening is disclosed in U.S. Pat. No. 4,385,076 to Crosby, issued May 24, 1983, which patent is herein incorporated by reference. Generally, about 50% by weight of the microfine flavor enhancing salt particles should have a particle diameter of less than about 20 microns, preferably about 90% by weight of the microfine flavor enhancing salt particles should have a particle diameter of less than about 10 microns.

F. Process

The solid and liquid nonaqueous shortening compositions herein can be made by processes well known to those skilled in the art. Generally, preparation will involve heating the lipid component of the shortening as needed until it liquifies, adding the particles of reducing sugar and other desired particulate materials under agitation to form a slurry and then cooling the composition to the desired appropriate temperature.

Preparation of a solid shortening composition containing reducing sugar particles is illustrated by the following example.

EXAMPLE

Crisco shortening, a solid shortening manufactured by The Procter & Gamble Company, is melted at 60° C. in a tank. Sodium chloride, flavorants, colors, and dextrose are added to the tank with agitation to suspend the insolubles in a slurry. The slurry is pumped through a scraped surface heat exchanger and cooled to about 18° C. with −18° C. brine. Nitrogen is injected into the slurry at about 13% by volume before the heat exchanger. The cooled slurry continues through a mildly agitated closed holding vessel with about 3 minutes residence time. The finished slurry is filled into cans, tubs, or other containers and allowed to solidify. The containers are held in a room at about 29° C. for about 48 hours before shipment.

Solid shortening formulas:

| I. | Crisco Shortening | 98.22% |
|---|---|---|
|  | Sodium chloride | 1.0% |
|  | Dextrose | 0.5% |
|  | Butter flavorant | 0.28% |
|  | Carotene color (24% conc.) | 80 ppm extra |
| II. | Crisco Shortening | 96.22% |
|  | Sodium chloride | 1.5% |
|  | Dextrose | 1.0% |
|  | Butter flavorant | 0.28% |
|  | Lecithin | 1.0% |
|  | Carotene color (24% conc) | 20 ppm extra |

What is claimed is:

1. A nonaqueous shortening composition comprising:
   (a) from about 90 to 99.5% by weight of an edible lipid;
   (b) from about 0.25 to 5% by weight of reducing sugar particles substantially uniformly suspended throughout the nonaqueous shortening composition; and
   (c) less than about 0.1% by weight of water.

2. A nonaqueous shortening composition according to claim 1 wherein the reducing sugar particles are nonencapsulated.

3. A nonaqueous shortening composition according to claim 1 wherein the reducing sugar particles are selected from the group consisting of glucose, dextrose, levulose, fructose, lactose, galactose and mixtures thereof.

4. A nonaqueous shortening composition according to claim 3 wherein the reducing sugar particles are dextrose.

5. A nonaqueous shortening composition according to claim 4 wherein the reducing sugar particles comprise from about 0.5 to 1.5% by weight of the nonaqueous shortening composition.

6. A nonaqueous shortening composition according to claim 1 further comprising a flavor-enhancing amount of a butter flavorant and from 0 to about 4% by weight of nonencapsulated salt particles substantially uniformly suspended throughout said nonaqueous shortening composition, said nonencapsulated salt particles being selected from the group consisting of sodium chloride, potassium chloride, potassium citrate, potassium bitartrate, monosodium glutamate and mixtures thereof.

7. A nonaqueous shortening composition according to claim 6 wherein the nonencapsulated flavor-enhancing salt particles are sodium chloride.

8. A nonaqueous solid shortening composition comprising:
   (a) from about 90 to 99.5% by weight of an edible lipid;
   (b) from about 0.5 to 1.5% by weight of reducing sugar particles substantially uniformly suspended throughout said nonaqueous solid shortening composition; and
   (c) less than about 0.1% by weight of water.

9. A nonaqueous solid shortening composition according to claim 8 wherein
   (a) the lipid component comprises triglycerides with $C_{12}$ to $C_{22}$ fatty fatty acid moieties; and
   (b) the reducing sugar particles are dextrose.

10. A nonaqueous solid shortening composition according to claim 9 which additionally contains a flavor-enhancing amount of a butter flavorant, and from 0 to about 4% by weight of nonencapsulated salt particles substantially uniformly suspended throughout said nonaqueous solid shortening composition, said nonencapsulated salt particles being selected from the group consisting of sodium chloride, potassium chloride, potassium citrate, potassium bitartrate, monosodium glutamate and mixtures thereof.

11. A nonaqueous liquid shortening composition comprising:
    (a) from about 90 to 99.5% by weight of an edible lipid;
    (b) from about 0.25 to 5% by weight of reducing sugar particles substantially uniformly suspended throughout said nonaqueous liquid shortening composition with about 50% by weight of said reducing sugar particles having a particle diameter of less than about 20 microns; and
    (c) less than about 0.1% by weight of water.

12. A nonaqueous liquid shortening composition according to claim 11 wherein the reducing sugar particles are selected from the group consisting of glucose, dextrose, levulose, fructose, lactose, galactose and mixtures thereof.

13. A nonaqueous liquid shortening composition according to claim 12 wherein
    (a) the lipid component comprises triglycerides with $C_{16}$ to $C_{22}$ fatty acid moieties; and
    (b) the reducing sugar particles are nonencapsulated and comprise dextrose.

14. A nonaqueous liquid shortening composition according to claim 13 wherein the dextrose particles comprise from about 0.5 to 1.5% by weight of the nonaqueous liquid shortening composition.

15. A nonaqueous liquid shortening composition according to claim 14 further comprising a flavor-enhancing amount of a butter flavorant and from 0 to about 4% by weight of nonencapsulated salt particles wherein about 50% by weight of the nonencapsulated salt particles have a diameter of less than about 20 microns, the nonencapsulated salt particles being selected from the group consisting of sodium chloride, potassium chloride, potassium citrate, potassium bitartrate, monosodium glutamate and mixtures thereof.

16. A nonaqueous liquid shortening composition according to claim 15 wherein the nonencapsulated salt particles are sodium chloride.

* * * * *